United States Patent [19]

Haigh

[11] 3,919,923
[45] Nov. 18, 1975

[54] FLUID FLOW CONTROL VALVE
[75] Inventor: Richard Woolliscroft Haigh, Worcester, England
[73] Assignee: Lucas Aerospace Limited, Birmingham, England
[22] Filed: Oct. 3, 1974
[21] Appl. No.: 511,797

Related U.S. Application Data
[63] Continuation of Ser. No. 342,706, March 19, 1973, abandoned.

[30] Foreign Application Priority Data
Mar. 18, 1972 United Kingdom............... 12799/72

[52] U.S. Cl. ..................... 91/51; 137/82; 137/612; 137/625.44; 137/625.62; 251/299
[51] Int. Cl.² ...................................... F15B 13/044
[58] Field of Search .......... 91/51; 137/82, 609, 610, 137/612, 625.44, 625.61, 625.62; 251/298, 299, 303

[56] References Cited
UNITED STATES PATENTS
1,854,110   4/1932   Copelin............................. 251/299
3,211,182  10/1965   Gyurik et al.................... 137/625.61
3,215,162  11/1965   Carver........................... 137/625.44

FOREIGN PATENTS OR APPLICATIONS
957,900   5/1964   United Kingdom..................... 91/51

OTHER PUBLICATIONS
IBM Technical Disclosure Bulletin, Vol. 10, No. 5, October 1967, pp. 568–569.

Primary Examiner—Alan Cohan
Assistant Examiner—Gerald A. Michalsky
Attorney, Agent, or Firm—Holman & Stern

[57] ABSTRACT
A fluid flow control valve for use in a fluid actuated servo mechanism is provided with a nozzle having a fluid flow passage therethrough opening into a part cylindrical end surface of the nozzle. A flow control member pivotable about an axis which is spaced from the axis of the end surface in a direction perpendicular both to the axis of the passage and the axis of the end surface has a part cylindrical control surface which is adjacent the end surface and of substantially the same radius.

6 Claims, 5 Drawing Figures

FLUID FLOW CONTROL VALVE

This is a continuation of application Ser. No. 342,706, filed Mar. 19, 1973, and now abandoned.

BACKGROUND OF THE INVENTION

This invention relates to fluid flow control valves which are particularly but not exclusively suitable for use in fluid pressure actuated servomechanisms.

SUMMARY OF THE INVENTION

A fluid flow control valve in accordance with the invention comprises a nozzle having an end surface on which a fluid flow passage opens, said end surface being of concave part cylindrical form with its axis transverse to the axis of the fluid flow passage, and a flow control member having a part-cylindrical surface portion of substantially the same radius as said end surface and mounted for pivotal movement about an axis parallel to and spaced from the axis of said end surface in a direction perpendicular both to the axis of the passage and the axis of said end surface, and arranged so that the part-cylindrical surface portion of the flow control member can make substantially face to face contact with the end surface of the nozzle.

Preferably, the valve comprises a pair of co-axial nozzles directed towards one another, the end surfaces having a common axis and the flow control member has two of said part-cylindrical surface portions. These part-cylindrical surface portions may have a common axis or they may have their axes spaced and parallel.

Alternatively, there may be three or more nozzles with their end surfaces co-axial and a single flow control member having a like number of said part cylindrical surfaces.

DETAILED DESCRIPTION OF THE EMBODIMENTS

Figure 1:
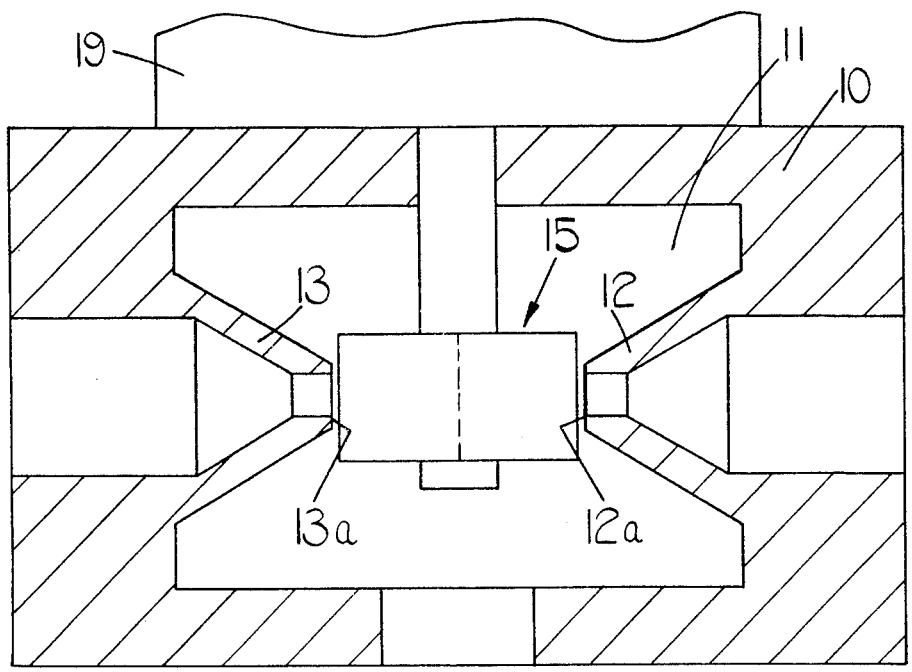
FIGS. 1 and 2 are mutually transverse sections through an example of a valve in accordance with the invention.
Figure 2:
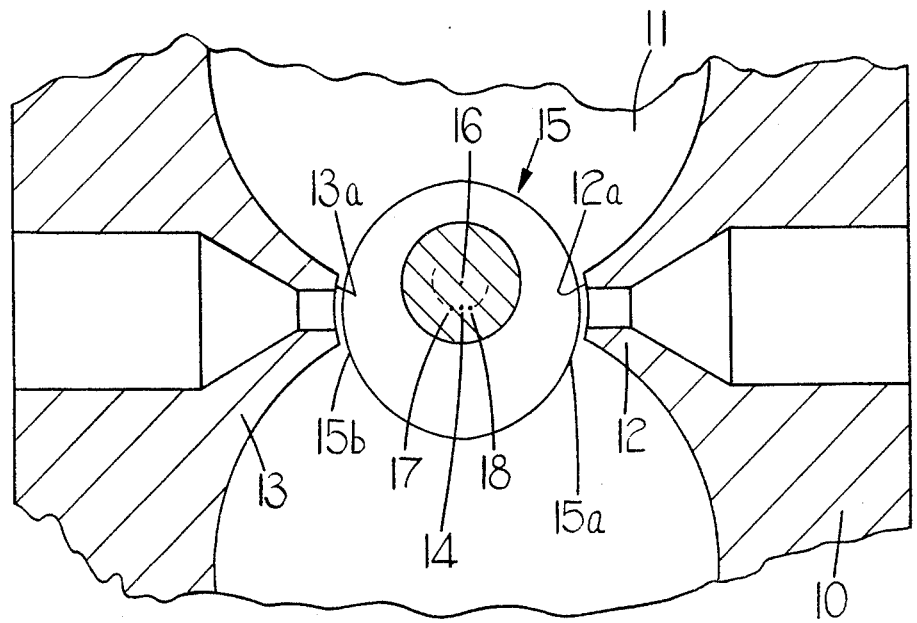

The valve shown in FIGS. 1 and 2 includes a body 10 defining a chamber 11 which has a pair of aligned oppositely directed inlet nozzles 12, 13. As shown in FIG. 2, each such nozzle has an end surface 12a, 13a which is of a concave cylindrical form, with the two end surfaces having a common axis 14 which is perpendicular to the common axis of the nozzles 12, 13.

Disposed between the nozzles 12, 13 is a flow control member 15 which is pivotable about an axis 16 parallel to the common axis of the cylindrical end surfaces 12a, 13a and spaced therefrom in a direction perpendicular to the common axis of the nozzles 12, 13. The flow control member has two convex part cylindrical surface portions 15a, 15b adjacent the nozzles 12, 13 respectively. These surface portions are of the same radius as the cylindrical end surfaces 12a, 13a and have their axes 17 18 spaced apart and lying on an arc struck from the axis 16 and passing through the axis 14. Thus, at extreme ends of the range of travel of the member 15, the surfaces 15a, 15b will mate with the end surfaces 12a, 13a respectively and seal off the respective nozzles 12, 13.

The flow control member 15 is carried by the output member of an electromagnet torque motor 19 which can be energized to turn the flow control member 15 in either direction as required.

When the flow control member 15 occupies a mid-position midway between the nozzles 12, 13, the flow numbers of the two nozzles will be equal, but displacement of the flow control member in either direction causes one nozzle to be progressively restricted until it is finally fully closed and the other to be progressively opened.

Figure 3:
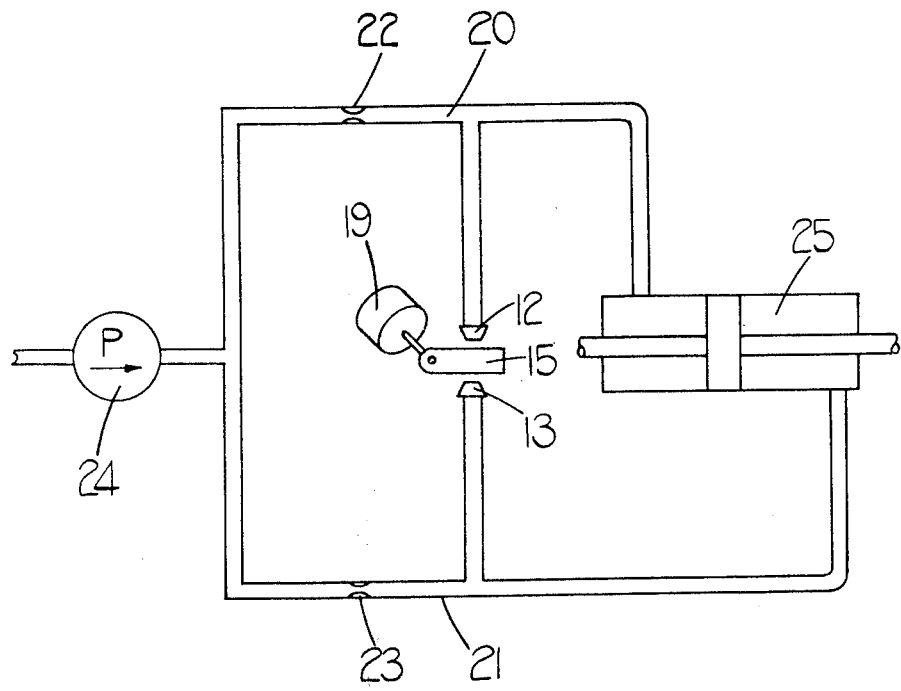
FIG. 3 is a diagram showing a servo-system incorporating the valve of FIGS. 1 and 2, and FIGS. 4 and 5 are sections like FIG. 2 but showing two alternative embodiments.

In the servo system shown in FIG. 3, the valve used to control the escape of fluid from two supply lines 20, 21, is connected via restrictors 22, 23 to the outlet of a pump 24. Thus, the relative pressures in the two supply lines will be determined by the position of the flow control member 15, with the supply lines 20, 21 being connected respectively to the ends of a double acting piston and cylinder unit 25. The member 15 is shown in FIG. 3 for convenience as a conventional simple flapper valve.

The valve shown in FIGS. 1 and 2 has several advantages as compared with a simple flapper type valve. Firstly, all the surfaces of the valve which require machining accurately are cylindrical and this is simpler than the machining of flat surfaces particularly where these are inclined to one another at a small angle (to obtain complete shut off at opposite extremes of bevel of the flapper). Secondly, the valve can readily be matched with a torque motor like that described and claimed in British Pat. application No: 38618/70 which has as a characteristic feature the ability to provide a relatively wide working angle, but a low torque. The spacing of the axis 16 from the axis 14 can be chosen that the full working angle can be employed without creating problems likely to be caused by large changes of the inclination of the portion of the surfaces 15a, 15b to the axis of the nozzles 12, 13. The torque load applied to the flow control member 15 by the jets issuing from the nozzles 13, 12 is thus kept low. This torque load also depends, of course, on the spacing of the axes 17, 18 and this distance can also be chosen to ensure proper matching of the torque characteristic of the valve to that of the torque motor 19. It is considered that for some applications, the valve described can be used as a single stage servo control whereas a two stage control would have been required in the prior art.

Figure 4:
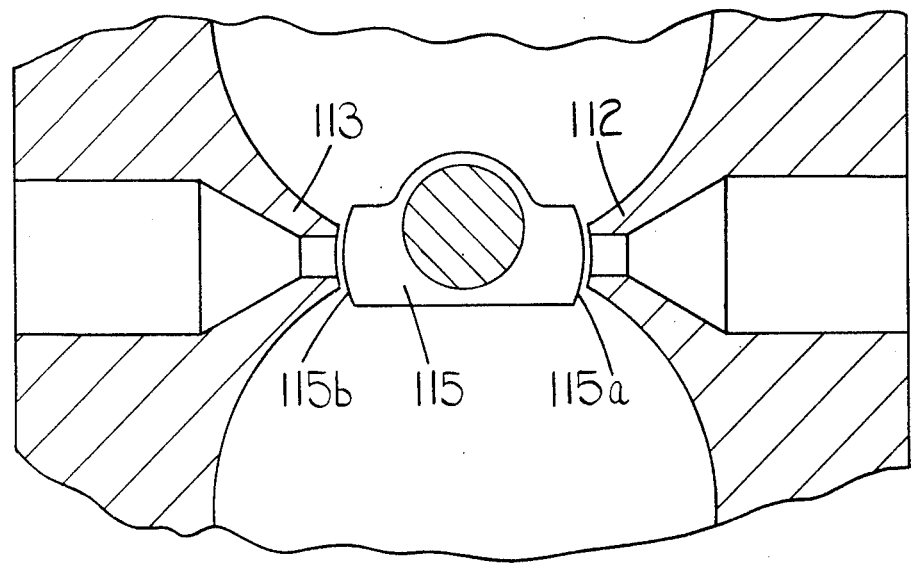

In the example of the invention shown in FIG. 4, the flow control member 115 is cut away so that the surfaces 115a, 115b terminate immediately outside the zones thereof which are adjacent the nozzles 112, 113 within the range of movement of the member 115. Thus, a relatively sharp corner, is provided at each end of each surface portion 115a, 115b so that fluid flowing over the surface portion can break away. This reduces to the torque load on the flow control member 115.

Figure 5:
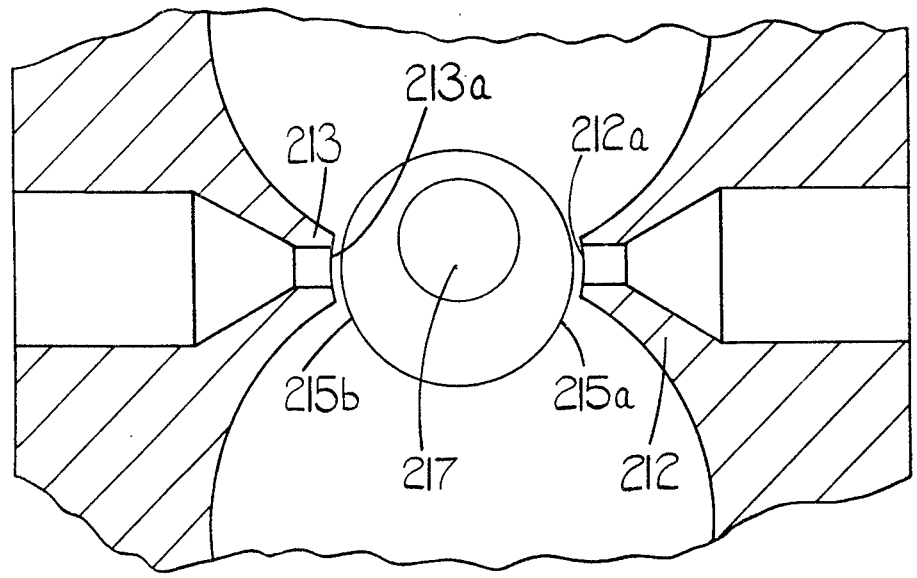

As shown in FIG. 5, in some applications, it may be unnecessary to have the axes 17, 18 spaced and in this case the surface portions 215a, 215b are portions of a single cylindrical surface struck from a single axis 217 and of slightly smaller radius than the nozzle end surfaces 212a, 213a. This has the effect of further simplifying the machining operations involved in the manufacture of the valve. Complete sealing off of a nozzle 212 or 213 is then not possible but, provided the bore of the nozzle is small compared with the end surface radius the loss in performance will not be significant.

In further alternative embodiments, there may be but a single nozzle or there may be three or more nozzles.

I claim:

1. A fluid flow control valve comprising a nozzle having an end surface on to which a fluid flow passage opens, said end surface being a part-cylindrical form with its axis transverse to the axis of the fluid flow passage, and a flow control member having a part-cylindrical surface portion of substantially the same radius as said end surface, said flow control member being mounted for movement about a pivotal axis lying within a cylindrical zone which is, in part, defined by said surface portion, said pivotal axis being in spaced, parallel relationship with the axis of said end surface and positioned so that the part-cylindrical portion of the flow control member can make substantially face to face contact with the end surface of the nozzle.

2. The fluid control valve as claimed in claim 1 in which there are two co-axial nozzle directed towards one another, the end surfaces of the nozzles having a common axis and the flow control member having two part-cylindrical control surfaces coacting with said nozzle end surfaces respectively.

3. The fluid flow control valve as claimed in claim 2 in which the flow control member is cut away so that said part cylindrical control surfaces terminate in sharp edges immediately outside those zones thereof which are adjacent the end surfaces of the nozzles.

4. The fluid flow control valve as claimed in claim 2 in which the control surfaces of the flow control member are portions of a single cylindrical surface having a radius slightly smaller than the radius of the end surfaces of the nozzle.

5. A fluid pressure actuated servo-mechanism comprising a pump having its outlet connected via restrictors to the fluid flow passages of the two nozzles of a fluid flow control valve as claimed in claim 2, said fluid flow passages also being connected to a fluid pressure operable actuator, and a torque motor for varying the position of the flow control member of the valve.

6. The fluid flow control valve as claimed in claim 2 in which the part-cylindrical surfaces of the flow-control member have their axis spaced and parallel and lying on an arc struck from the pivot axis of the flow control member and passing through the common axis of the end surfaces of the nozzles.

* * * * *